United States Patent
McGuire

[15] 3,701,548
[45] Oct. 31, 1972

[54] PIPE JOINT SYSTEM
[72] Inventor: John S. McGuire, P.O. Box 157, Ozark, Mo.
[22] Filed: June 25, 1970
[21] Appl. No.: 49,596

[52] U.S. Cl..............285/81, 285/360, 285/DIG. 16
[51] Int. Cl........F16l 19/02, F16l 21/08, F16l 37/24
[58] Field of Search......285/360, 362, 376, 401, 423, 285/DIG. 16, 81

[56] References Cited

UNITED STATES PATENTS

| 2,408,243 | 9/1946 | Vartanian | 285/360 X |
| 2,498,831 | 2/1950 | Veitch | 285/423 X |
| 2,706,122 | 4/1955 | Bright | 285/423 X |
| 3,116,942 | 1/1964 | Morello, Jr. | 285/401 X |

FOREIGN PATENTS OR APPLICATIONS

| 257,681 | 2/1965 | Australia | 285/423 |
| 642,982 | 6/1962 | Canada | 285/376 |

Primary Examiner—David J. Williamowsky
Assistant Examiner—David H. Corbin
Attorney—Fishburn, Gold and Litman

[57] ABSTRACT

A system for joining elongate interfitting male and female portions of adjacent tubular members having interengaging locking means on the male and female portions to retain the male portion within the female portion and to effect relative longitudinal movement of the male portion into the respective female portion which moves cooperative seating surfaces on the male and female portions into sealing engagement in response to relative rotative movement of the male and female portions after interengagement of the locking means.

6 Claims, 10 Drawing Figures

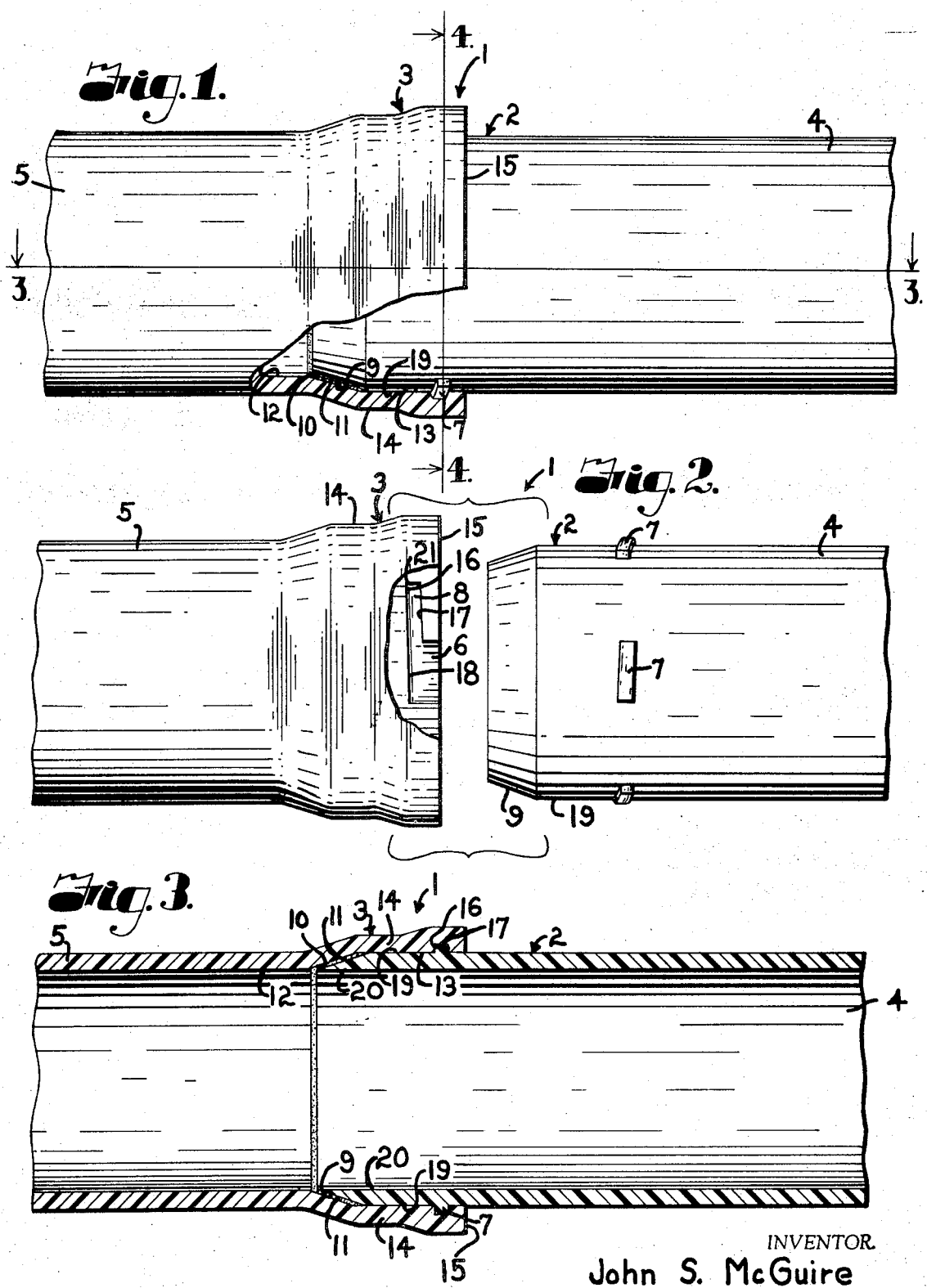

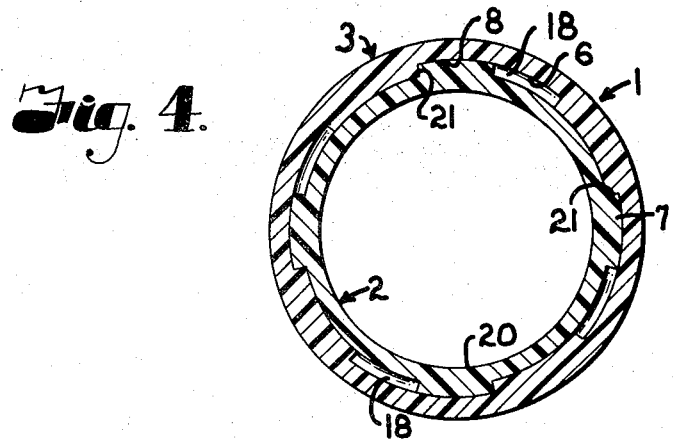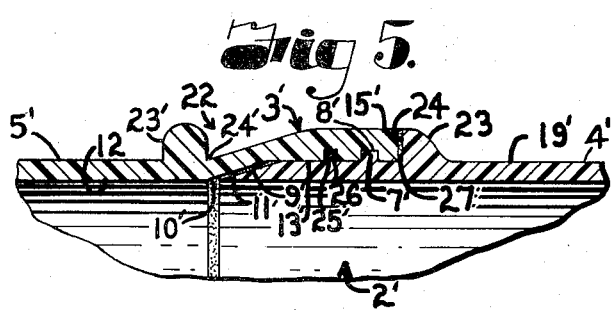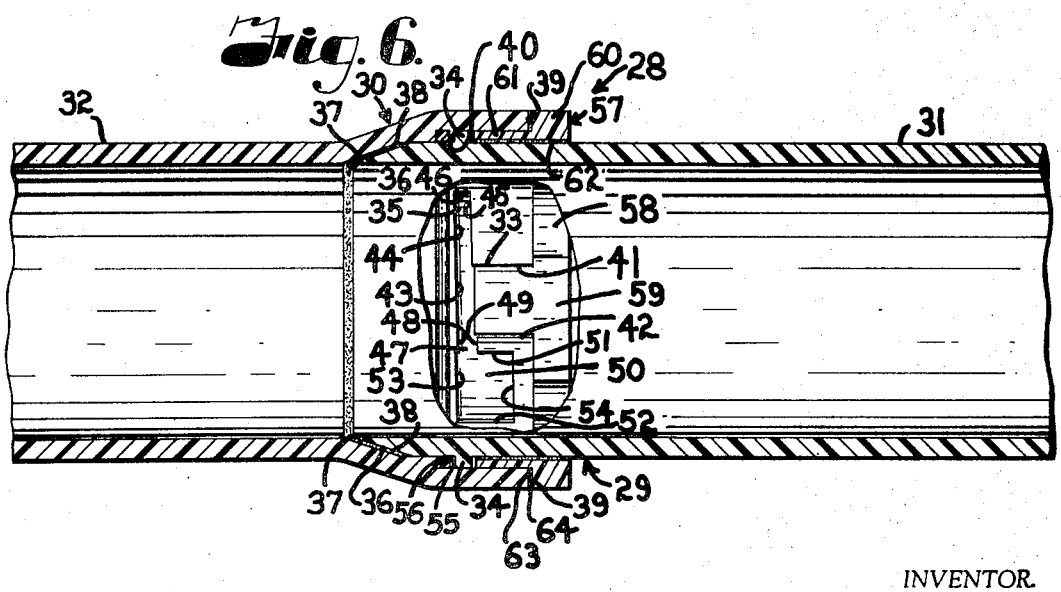

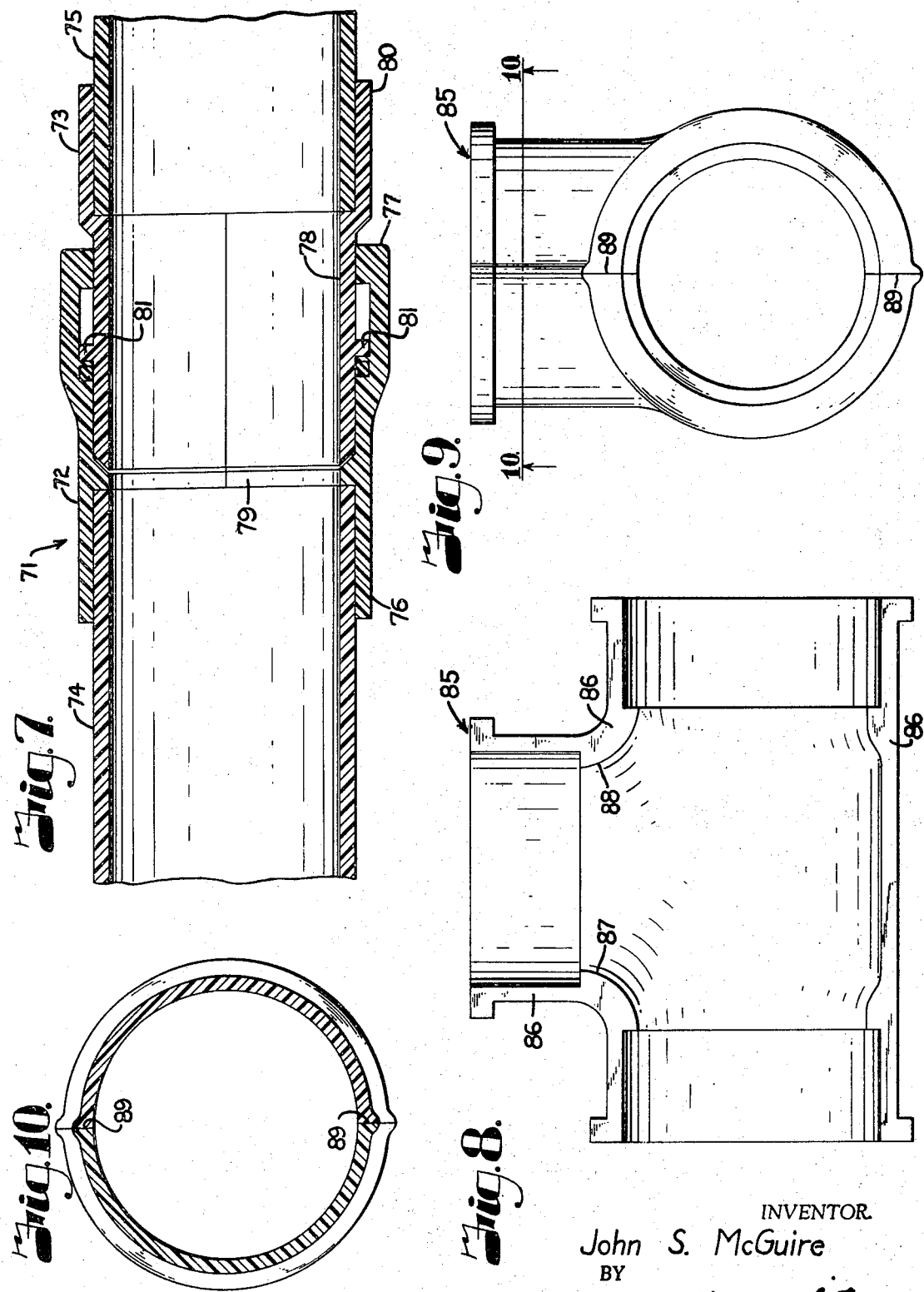

PIPE JOINT SYSTEM

The present invention relates to a system for joining pipe and more particularly to a system for joining plastic pipe in a weld type joint.

The principal objects of the present invention are: to provide a system for joining male and female portions of tubular members, in the form of pipe sections, to form a joint structure having smooth, laminar flow characteristics and which is adapted to prevent separation of the male and female portions; to provide such a pipe joint structure providing easy joining of pipe sections at any temperature which permits safe handling of the pipe; to provide such a pipe joint structure adapted for positively holding the joined sections together during severe post assembly handling and installation operations; to provide such a pipe joint structure adapted to selectively form a rigid joint or to allow relative longitudinal movement of the joined pipe sections while restraining separation thereof; to provide such a pipe joint structure of the "Bell and spigot type" wherein the bell or female portion has longitudinal and circumferential passages therein which are adapted to receive lugs on a spigot end or male portion and the bell or female portion has a seat therein to be engaged by a mating end of said spigot end of a pipe section connected thereto; to provide such a bell and spigot seal joint structure wherein seating surfaces may be mechanically engaged for releasable connections or provided with a bonding or electro magnetic adhesive material and held together during hardening or curing; to provide such a pipe joint structure adapted to hold the sections of pipe being joined in a substantially immobile position during curing or adhering of bonding material between the seat and mating end; to provide such a pipe joint structure wherein the joined pipe sections are adapted to be laid under compression and the spigot end has an integral collar to engage the free end of the bell thereby increasing the strength of the joint; to provide such a pipe joint structure particularly adapted for joining material such as plastic that can be upset or compression molded to form male and female portions of tubular members by upsetting the ends thereof; to provide such a pipe joint structure wherein the joint portions are the same material and of suitable thicknesses thereby having substantially the same expansion and contraction with temperature variations; to provide such pipe joint structure which provides positive control of internal diameters and roundness for full flow therethrough; and to provide such a pipe joint structure which is economical to manufacture, provides positive joints, is versatile in use, is particularly well adapted for, but not limited to, use with plastic pipe having upset male and female ends, and is particularly well adapted for the proposed use.

Other objects and advantages of this invention will become apparent from the following description taken in connection with the accompanying drawings wherein are set forth by way of illustration and example certain embodiments of this invention.

FIG. 1 is a plan view of a pipe joint structure formed of interfitting male and female portions of tubular members embodying features of the present invention with portions broken away to better illustrate the component parts.

FIG. 2 is an exploded side elevational view of the pipe joint structure.

FIG. 3 is a longitudinal sectional view through the pipe joint structure shown in FIG. 1.

FIG. 4 is a transverse sectional view through the pipe joint structure taken on line 4—4, FIG. 1.

FIG. 5 is a fragmentary longitudinal sectional view showing a modified male portion having an integral collar thereon for seating on and sealingly engaging a free end of the female portion also having an integral collar.

FIG. 6 is a longitudinal sectional view through a pipe joint structure having a modified female portion and a separable collar having portions received in the female portion to restrain relative rotation of the male and female portions while allowing relative longitudinal movement therebetween.

FIG. 7 is a longitudinal sectional view of a modified pipe joint structure formed of a pair of joint end portions having interfitting male and female portions with each having female ends mounted on plain male ends of pipe sections.

FIG. 8 is a side elevational view of one-half of a short fitting prior to being joined together with a like half to form a completed fitting.

FIG. 9 is an end elevational view of the completed fitting.

FIG. 10 is a transverse sectional view through the completed fitting taken on line 10—10, FIG. 9.

Referring more in detail to the drawings:

The reference numeral 1 generally designates a joint structure for joining elongate interfitting male and female portions 2 and 3 of adjacent tubular members 4 and 5 respectively. The male and female portions 2 and 3 have interengaging locking means to retain the male portion 2 within the respective female portion 3 and to effect relative longitudinal movement of the male portion 2 into the respective female portion 3 for sealing the joint 1 upon interengagement of cooperative seating surfaces on the male and female portions 2 and 3 in response to relative rotative movement of the male and female portions 2 and 3 after interengagement of the locking means.

In the illustrative structure, the female portion 3 has a plurality of longitudinal passages 6 circumferentially spaced therearound to receive a respective one of a like plurality of lugs 7 circumferentially spaced around and extending radially outwardly from the male portion 2. A circumferential passage 8 extends from one side of each of the longitudinal passages 6 and the circumferential passages 8 are positioned and shaped to draw a mating end 9 of the male portion 2 into firm seating engagement with a seat 10 within the female portion 3 upon relative rotation of the male and female portions 2 and 3 to move the lugs 7 along the respective circumferential passages 8 whereby the male and female portions 2 and 3 are held in a substantially immobile position during curing of bonding or adhering material 11 placed on the mating end 9 of the male portion 2 and on the seat 10 within the female portion 3.

The engagement of the lugs 7 within the circumferential passages 8 maintains the roundness of both the female portion 3 and the male portion 2 of the respective tubular members 4 and 5, thereby providing full flow of the fluid or liquid therethrough.

The seat 10 within the female portion 3 is illustrated as an outwardly enlarging conical surface extending from an interior surface 12 of the tubular member 5 having the female portion 3 thereon. The conical seat 10 is so sized whereby an interior surface 13 of the female portion 3 has an interior diameter which provides suitable clearance therein for longitudinal movement of the male portion 2 within the respective female portion 3 for effecting coupling therewith.

The longitudinal and circumferential passages 6 and 8 respectively are recessed into the interior surface 13 of the female portion 3 and a wall member 14 forming the female portion 3 may be enlarged or thickened outwardly at the longitudinal and circumferential passages 6 and 8 to maintain a wall thickness at least equal to the wall thickness of the remainder of the female portion 3 and the respective tubular member 5.

Each of the longitudinal passages 6 provides an entrance for the respective lug 7 and is positioned at a free end 15 of the respective female portion 3. The longitudinal passages 6 each provide suitable clearance for the longitudinal movement of the respective lug 7 therein while restraining relative rotation of the male and female portions 2 and 3.

Each of the circumferential passages 8 extends circumferentially from one side of the respective longitudinal passage 6 and is spaced from the free end 15 of the female portion 3. The circumferential passages 8 are defined by longitudinally spaced and substantially parallel side walls 16 and 17 with the walls 16 and 17 being longitudinally spaced apart to provide suitable clearance for circumferential movement of the respective lug 7 being received therein. The side walls 16 and 17 define a path which is inclined relative to the longitudinal axis of the tubular members 4 and 5 to effect longitudinal movement of the male portion 2 within the respective female portion 3. The path may be a partial helex or inclined whereby the mating end 9 is drawn into firm seating and sealing engagement with the seat 10 upon relative rotation of the male and female portions 2 and 3 for moving the lugs 7 into and along the respective circumferential passages 8 to effect relative longitudinal movement of the respective tubular members 4 and 5 to seat same and thereby restrain further relative longitudinal movement to permit curing of the adhering material 11.

One of the walls defining the circumferential passage 8, for example side wall 16, is an extension of an end wall 18 of the longitudinal entrance passage 6 to provide for smooth movement of the respective lug upon relative rotation of the tubular members 4 and 5. The end wall 18 also has substantially the same incline as the circumferential passage 8 relative to the longitudinal axis of the tubular members 4 and 5 to guide the respective lug 7 into the circumferential passage 8.

The mating end 9 of the male portion 2 is a conical surface which is complementary to the conical surface of the seat 10 and tapers inwardly from an exterior surface 19 of the male portion 2 and upon seating within the female portion 3 an interior surface 20 of the male portion 2 and the interior surface 12 of the tubular member 5 are in registry thereby providing a smooth uninterrupted surface to effect laminar flow of any fluid or liquid therein.

The lugs 7 are circumferentially spaced around the male portion 2 adjacent the mating end 9 thereof and the lugs extend radially outwardly from the exterior surface 19 of the male portion 2. The lugs are angularly disposed relative to the longitudinal axis of the tubular member 4 so as to conform to the inclined path defined by the side walls 16 and 17 of the circumferential passages 8 and the end wall 18 of the longitudinal passage 6 whereby rotation of the male portion 2 relative to the female portion 3 moves the lugs 7 into the respective circumferential passages 8 thereby drawing the mating end 9 into firm seating and sealing engagement with the seat 10.

In making a permanent joint between the male and female portions 2 and 3, it is preferred to use an adhering material 11, such as a solvent for plastic pipe or suitable adhesive or cement material including electromagnetic adhesives which is heated and cured by subjecting it to a suitable electric field. A suitable adhesive is placed on the mating end 9 and seat 10. The male end portion 2 is then inserted into the female portion 3 with the lugs 7 being received within the longitudinal entrance passages 6 of the female portion 3. The male portion 2 is moved into the female portion 3 until the lugs 7 engage the end wall 18 of the respective longitudinal entrance passage 6 thereby stopping the insertion movement of the male portion 2. The male portion 2 is then rotated so that the final closing action is made by the lugs 7 moving into the respective circumferential passages 8 and bearing against an end wall 21 thereof.

In solvent welding of plastic pipe, the interfaces of the mating conical surfaces of the mating end 9 and seat 10 are softened by a suitable solvent or cement and the initial contact is made by insertion of the male 2 into the female portion 3 and the circumferential movement of the lugs 7 within the circumferential passages 8 provides and maintains substantial pressure on the interfaces being welded. In the adhering of the pipe portions, the parts are prepositioned substantially in engagement at the adhesive coated areas then the relative rotary movement of the male and female portions 2 and 3 also provides a wiping action and the compression which further enhances the fusion between the adhering material 11 and the surfaces on which same is placed and this holds the position until the adhering material is cured.

FIG. 5 illustrates a modified pipe joint structure 22 having an annular collar 23 which is integral with and extends radially outwardly from the exterior surface 19' of the male end portion 2' for engaging the free end 15' of the female portion 3'. The collar 23 has an abutment surface or shoulder 24 positioned to engage and seat on the free end 15' of the female portion 3' when the mating end 9' of the male end portion 2' is engaged with the seat 10' within the female portion 3' in response to relative rotative movement of the male and female portions 2' and 3', after interengagement of the lugs 7' within the respective circumferential passages 8'.

Particularly for high pressure fluids or liquids, it is desirable to add a gasket to aid in providing a fluid or liquid tight joint. In such a structure, an annular recess 25 is formed in the interior surface 13 of the female portion 3' to receive a suitable seal member 26, such as an O-ring or a self energized gasket, which is sized to sealingly engage both the exterior surface 19' of the male end portion 2' of the tubular member 4' and the female portion thereby providing a mechanical joint having the additional protection of a gasketed joint.

The pipe joint 22 having the collar 23 as illustrated in FIG. 5, is made substantially the same as for the tubular members 4' and 5' illustrated in FIGS. 1 to 4 inclusive, however, a bonding or adhering material 27 is placed on the shoulder 24 and on the free end 15' of the female portion 3' in addition to the adhering material 11' placed on the mating end 9' and seat 10' whereby the shoulder 24 and the free end 15' of the female portion 3' are secured together upon curing of the adhering or bonding material 27. The collar 23 is particularly adapted to resist reverse compressive thrusts longitudinally along the tubular members 4' and 5' which develop during continuous or automatic laying thereof and the collar 23 assists the transfer of compressive thrust from the female portion 3' to the male portion 2' thereby reducing the stress on the welded interface between the mating end 9' and the seat 10'. A collar 23' is also provided on the female portion as at 24'. The collars 23 and 23' are of a size to provide support for the pipe when stacked or stored. These collars carry the stacking load so no load is applied to the bell or spigot ends and eliminates the deformation that commonly occurs in stacked pipe.

FIG. 6 illustrates a further modified pipe joint structure 28 adapted to selectively permit relative longitudinal movement and to prevent separation or slip outs of a male portion 29 from a female portion 30 of tubular members 31 and 32 respectively or to form a welded type joint between the male and female portions 29 and 30. It may be desirable to have several adjacent joints of the welded type and to separate same from a like series of welded joints by one or more of expansion type joints to form a completed pipe line.

The female portion 30 has a plurality of longitudinal passages 33 circumferentially spaced therearound to receive a respective one of a like plurality of lugs 34 circumferentially spaced around and extending radially outwardly from the male portion 29. A circumferential passage 35 extends from one side of each of the longitudinal passages 33 and the circumferential passages 35 are positioned and shaped to draw a mating end 36 of the male portion 29 into firm seating and sealing engagement with a seat 37 within the female portion 30 upon relative rotation of the male and female portions 29 and 30 to move the lugs 34 along the respective circumferential passages 35 whereby the male and female portions 29 and 30 are held in a substantially immobile position during curing of bonding or adhering material 38 placed on the mating end 36 of the male portion 29 and on the seat 37 within the female portion 39.

In the illustrated structure, the longitudinal passage 33 is positioned at a free end 39 of the female portion 30 for receiving a respective lug 34 therein for longitudinal movement therealong. The longitudinal entrance passage 33 is recessed into an interior surface 40 of the female portion 30 and the longitudinal passage 33 is defined by a circumferentially spaced and substantially parallel side walls 41 and 42 extending longitudinally into the female portion 30 from the free end 39 thereof. An end wall 43 of the longitudinal entrance passage 33 is longitudinally spaced from the free end 39 to define the limits of longitudinal travel of a respective lug 34 therein.

Each of the longitudinal passages 33 provides an entrance for the respective lug 34 and the side walls 41 and 42 are circumferentially spaced to provide suitable clearance for the longitudinal movement of the respective lug 34 therein while restraining relative rotation of the male and female portions 29 and 30.

Each circumferential passage 35 extends circumferentially from one side of the respective longitudinal passage 33 and is spaced from the free end 39 of the female portion 30. The circumferential passages 35 are defined by longitudinally spaced and substantially parallel side walls 44 and 45 which are longitudinally spaced apart to provide suitable clearance for circumferential movement of the respective lug 34 being received therein. The side walls 44 and 45 define an inclined path relative to the longitudinal axis of the tubular members 31 and 32 to effect longitudinal movement of the male portion 29 within the respective female portion 30.

The path may be partial helex whereby the mating end 36 is drawn into firm seating and sealing engagement with the seat 37 upon relative rotation of the male and female portions 29 and 30 to move the lugs 34 into and along the respective circumferential passages 35 whereby relative longitudinal movement of the respective tubular member 31 and 32 is restrained to permit curing of the bonding or adhering material 38.

One of the walls defining each circumferential passage 35, for example, side wall 44 is an extension of the end wall 43 of the longitudinal entrance passage 33 to provide a smooth movement of the respective lug 34 upon relative rotation of the tubular members 31 and 32. The end wall 43 also has substantially the same incline as the circumferential passage 35 relative to the longitudinal axis of the tubular members 31 and 32 to guide the respective lug 34 into the circumferential passage 35 and into engagement with an end wall 46 thereof.

It may be desirable to permit relative longitudinal movement of the tubular members 31 and 32 at the pipe joint structure 28, such as for excessive expansion and contraction resulting from wide temperature ranges, therefore, a guide passage or way 47 extends circumferentially from the other side of the longitudinal entrance passage 33 substantially opposite the circumferential passage 35 and the way 47 is also longitudinally spaced from the free end 39 of the female portion 30. The way 47 is defined by side walls 48 and 49 longitudinally spaced apart a distance sufficient to provide suitable clearance for the circumferential movement of the respective lug 34 therethrough.

A lug receiving pocket 50 extends circumferentially from and communicates with the way 47 to receive the respective lug 34 therefrom upon relative rotation of the male and female members 29 and 30 for moving the lugs 34 from the respective longitudinal entrance passages 33, through the way 47, and into the respective lug receiving pocket 50.

The lug receiving packets 50 are adapted to permit relative longitudinal movement of the tubular members 31 and 32 while restraining relative rotation therebetween. In the illustrated structure, the lug receiving pockets 50 are each defined by circumferentially spaced side walls 51 and 52 which are spaced apart a distance sufficient to provide suitable clearance for longitudinal movement of the respective lugs 34 therein. Longitudinally spaced end walls 53 and 54 define the limits of the longitudinal movement of the respective lugs 34 therein.

One of the end walls of the lug receiving pocket 50, for example, end wall 53, is positioned to allow interengagement of the seating surfaces of the mating end 36 and seat 37 and in the illustrated structure, the end wall 53 is positioned farther from the free end 39 of the female portion 30 than the end wall 43 of the entrance passage 33. The end walls 53 and 54 of the lug receiving pockets 50 may also be inclined relative to the longitudinal axis of the tubular members 31 and 32 to conform to the angular position of the respective lugs 34.

When the relative longitudinal movement occurs between the tubular members 31 and 32, it is necessary to provide a mechanical seal for the joint structure 28, therefore, at least one annular recess 55 is formed in the interior surface 40 of the female portion 30 and positioned intermediate the circumferential passages 35 and the seat 37 within the female portion 30. A suitable seal member 56, such as an O-ring or a self-energizing gasket, is installed in the annular recess 55 to sealingly engage the male end portion 29 during relative longitudinal movement within the respective female portion 30.

In the event that the lugs 34 become positioned adjacent the guide passage or ways 47 and relative rotation occurs between the male and female portions 29 and 30, it is possible for the lugs 34 to move from the respective lug receiving pockets 50 and into the longitudinal passage 33. Slipouts or separations of the male and female portions 29 and 30 are then possible upon the occurrence of relative longitudinal movement therebetween. It is therefore desirable to prevent the escape of the lugs 34 from the respective lug receiving pockets 50. Therefore, a separate collar 57 is slidably mounted on the tubular member 31 and the collar 57 has a plurality of circumferentially spaced recesses 58 in an interior surface 59 of an annular body portion 60 to provide clearance for the lugs 34 on the exterior surface of the male portion 29 during placing of the collar 57 on the tubular portion 31.

The collar 57 has a plurality of projections or arms 61 extending from the annular body portion 60 thereof. The number of projections or arms 61 being equivalent to the number of longitudinal entrance passages 33 at the free end 39 of the female portion 30.

Adhering or bonding material 62 is placed on the interior surface 59 of the annular body portion 60 and the collar 57 is slid along the tubular member 31 to move the projections or arms 61 into the respective longitudinal entrance passages 33 after the male portion 29 and the female portion 30 are joined together. Upon curing of the adhering or bonding material 62, the collar 57 is secured to the tubular member 31 with the projections or arms 61 being positioned within the longitudinal passages 33.

An abutment surface or shoulder 63 of the collar 57 engages the free end 39 of the female portion 30 and may be secured thereto upon placing of bonding or adhering material 64 on the free end 39 and on the abutment surface or shoulder 63. When the interior surface 59 of the collar 57 is secured to the male portion 29 and the abutment surface 63 is secured to the free end 39 of the female portion 30 and the lugs 34 are within the circumferential passages 35 thereby effecting the seating engagement of the mating end 36 and seat 37, the joint so formed has characteristics substantially similar to the joint as illustrated in FIG. 5 and will resist compressive thrust between the tubular members 31 and 32.

When the lugs 34 are positioned within the respective lug receiving pockets 50 and the projections or arms 61 are received within the longitudinal entrance passages 33, relative rotation between the tubular members 31 and 32 is prevented, thereby eliminating the possibility of separation of the respective male and female portions 29 and 30 while permitting relative longitudinal movement therebetween within the limits defined by the end walls 53 and 54 of the lug receiving pocket 50.

In making a joint wherein contraction is anticipated upon cooling, such as during hot weather, the lugs 34 are moved into the lug receiving pockets 50 and moved to engage the end wall farthest from the free end 39, for example, end wall 53, thereby permitting the lugs 34 to move into engagement with the other end wall 54 in response to contraction of the adjacent tubular members 31 and 32, as upon cooling of the tubular members 31 and 32. When the joint is made between cold pipe and expansion is anticipated, as in cold weather, the lugs 34 are positioned to engage the other end wall 54 adjacent the free end 39 of the female portion 30 whereby expansion, as upon heating, permits the lugs 34 to move longitudinally to engage the end wall 53. In either hot or cold installations, the lugs 34 may move the full longitudinal distance between the end walls 53 and 54 upon contraction or expansion of the respective tubular members 31 and 32.

When the male and female portions 29 and 30 are at a temperature substantially equal to the surrounding air temperature, as during periods between hot and cold weather, such as spring and fall, the lugs 34 are positioned intermediate the end walls 53 and 54 thereby providing longitudinal expansion and contraction with the respective lugs 34 moving between the end walls 53 and 54.

FIG. 7 illustrates a modified pipe joint structure 71 having a pair of joint end portions 72 and 73 secured on ends of plain end pipe sections 74 and 75 respectively wherein the pair of joint end portions 72 and 73 are joined together substantially as previously described. Each of the pipe sections 74 and 75 have a joint end portion 72 secured on one end and a joint end portion 73 secured on the other end.

One of the joint end portions, for example, end portion 72, has a first female portion 76 at one end thereof which is adapted to receive therein and be secured on an end of one of the plain end pipe sections, as by a suitable cement. The other end of the joint end portion 72 is a second female portion 77 which is adapted to receive a male portion 78 of the other joint end portion 73, as later described.

The first and second female portions 76 and 77 of the joint end portion 72 are separated by an annular rib portion 79 extending radially inwardly from an interior surface of the joint end portion 72 intermediate the ends thereof. The annular rib portion 79 is shaped to be seatingly engaged by the end of the respective pipe section and the end of the male portion 78 of the joint end portion 73 respectively.

The other joint end portion 73 has the male portion 78 at one end and a female portion 80 at the other end thereof. The male portion 78 has interengaging locking means thereon in the form of lugs 81 which are similar to the lugs 7, as shown in FIG. 2. The female portion 80 of the joint end portion 73 is adapted to receive therein and be secured on a plain male end of one of the plain end pipe section, as by a suitable cement.

The second female portion 77 of the joint end portion 72 has longitudinal and circumferential passages similar to those illustrated in FIGS. 1 to 4 inclusive or the second female portion 77 of the joint end portion 72 may be formed as shown in FIG. 6 to selectively permit longitudinal movement between the joint end portions 72 and 73 and the passages in the second female portion 77 may also be adapted to form a welded joint to prevent separation or slip-out of the male portion 78 from the second female portion 77, as illustrated in FIG. 6.

It has been found that molded pipe and fittings are more dimensionally stable than extruded pipe and fittings, therefore, the joint end portions 72 and 73 may be injection or compression molded in symmetrical halves which are then joined together by suitable welding techniques, such as solvent welding, heat fusion, electro magnetic adhesives, and the like. It has also been found that substantially improved flow characteristics are obtained in fittings having a body portion and at least one branch intersecting the body portion, such as tees, wyes, double wyes, and the like, when sharp corners therein have been eliminated by injection or compression molding symmetrical halves which are then joined together to form a completed fitting.

FIG. 8 illustrates one-half of a fitting 85 having a body portion and a branch integral with the body portion wherein the half section has a contact surface 86 to be engaged by a like contact surface of a symmetrical section to form the completed short fitting 85, as illustrated in FIGS. 9 and 10. The sharp corners usually found in fittings formed at the intersection of complicated cores in conventional molds have been replaced by arcuate surfaces 87 and 88 to substantially improve the flow characteristics from or into the various arms of the fitting 85.

It is preferred that the contact surfaces 86 extend longitudinally of the fitting and the arms or branches thereof to form joint lines 89 in the completed fitting wherein a finished joint thickness of each joint line 89 has a thickness at least equal to the thickness of adjacent wall portions of the symmetrical halves of the completed fitting. When a reactive material, such as a ferrous metal or the like, is used with high frequency electro magnetic welding techniques, it is necessary to increase the thickness at the joint lines 89 by an amount at least equal to the amount of metal placed on the contact surfaces.

It is desirable to maintain a smooth interior surface of uniform cross section, therefore, a form member (not shown) is placed in engagement with the interior surfaces of the symmetrical halves on each side of the respective joint lines whereby the resulting increase in thickness or flash will extend outwardly from the exterior surface.

While the forming of symmetrical halves and joining same together to form a completed member is particularly adapted for forming fittings having one or more arms or branches, it is noted that when interfitting members, such as the joint end portions 72 and 73 and pipe ends to be received in the arms or branches of fittings, are formed of symmetrical halves joined together by means forming an outwardly extending flash, it is necessary to remove the flash from the male portion to permit same to be received within the respective female portion.

It is to be understood that while I have illustrated and described certain forms of my invention, it is not to be limited to these specific forms or arrangements of parts herein described and shown.

What I claim and desire to secure by Letters Patent is:

1. A pipe joint system comprising:
   a. elongate adjacent tubular members having interfitting male and female portions, said female portion having an elongate substantially cylindrical inner surface terminating in an elongate tapered seat, said male portion having an elongate tapered seat end and a cylindrical part extending therefrom corresponding to the inner surface and seat of the female portion, said cylindrical surfaces having suitable clearance therebetween for longitudinal movement of the male portion within said female portion for effecting coupling therewith, said cylindrical surface of the female portion being of a length to provide alignment support for said seats when engaged;
   b. interengaging locking means on said male and female portions for retaining said male portion within said respective female portion and for effecting longitudinal movement of said male portion within said respective female portion in response to relative rotative movement of said male and female portions after interengaging of said locking means, said interengaging locking means including:
      1. a plurality of lugs circumferentially spaced around said male portion and spaced from said seat thereof, said lugs extending radially outwardly from said cylindrical surface of said male portion;
      2. a like plurality of circumferentially spaced longitudinal passages extending into said female portions from a free end thereof for receiving said respective lugs therein and having surfaces for engagement by said lugs;
      3. a like plurality of circumferential passages extending from one side of said respective longitudinal passages, said circumferential passages being spaced from the free end of said female portion and with each having a side surface toward said free end disposed at an angle with the longitudinal axis of the respective tubular member, said angled passage side surfaces being spaced from the seat in the female member a distance substantially corresponding to the spacing of the lugs from the male seat whereby relative rotative movement of said male and female portions with said lugs engaged with said respective angled passage side surfaces effects movement of the male portions inwardly of the female portion forcing said seats into seating engagement;

c. a way extending circumferentially from each of said longitudinal passages in a direction opposite from said first named circumferential passages, said ways being spaced from the free end of said female portions;

d. a lug receiving pocket extending circumferentially from each of said ways to receive said respective lug therein upon relative rotative movement of said male and female portions for moving said lugs through said ways and into said respective lug receiving pockets, said lug receiving pockets each having a longitudinal dimension substantially greater than the longitudinal thickness of said respective lug received therein, whereby said pockets allow relative longitudinal movement of said male and female portions;

e. sealing means engaging said male and female portions for mechanically sealing the joint during said relative longitudinal movement;

f. a collar slidably mounted on said male portion;

g. a plurality of projections extending from said collar and received within said longitudinal passages of said female portions; and h. means for securing said collar on said male portion while said projections are positioned within said longitudinal passages thereby restraining relative rotation of the respective male and female portions to avoid separation thereof.

2. A pipe joint system comprising:

a. elongate adjacent tubular members having interfitting male and female portions, said female portion having an elongate substantially cylindrical inner surface and a free end, said male portion having a substantially cylindrical outer surface corresponding to the inner surface of the female portion and having a free end, said cylindrical surfaces having suitable clearance therebetween for longitudinal movement of the male portion within the female portion for effecting coupling therewith;

b. interengaging means on said male and female portions including:

1. a plurality of lugs circumferentially spaced around said male portion and spaced from the free end thereof, said lugs extending radially outwardly from said cylindrical surface of said male portion; and 2. a like plurality of circumferentially spaced longitudinal passages extending into said female portion from the free end thereof for receiving said respective lugs therein and having surfaces for engagement by said lugs;

c. a way extending circumferentially from one side of each of said longitudinal passages, said ways being spaced from the free end of said female portion;

d. a lug receiving pocket adjacent to each of said longitudinal passages and extending circumferentially from said respective way, said pocket to receive said respective lug therein upon relative rotation of the male and female portions to effect movement of said lug through said way into said respective lug pocket, said lug receiving pockets each having the internal longitudinal dimension substantially larger than the longitudinal thickness of said respective lug received therein to allow substantial longitudinal movement of said lugs within said pockets whereby, substantial relative longitudinal movement of said male portion within said female portion is allowed thereby compensating for expansion and contraction of said male and female members; and e. one of said male and female portions having a groove in the cylindrical surface and spaced from ends thereof, sealing means in said groove and engaging the cylindrical surface of the other of said male and female members for mechanically sealing said joint during said relative longitudinal movement.

3. A pipe joint as set forth in claim 2 including:

a. a collar slidably mounted on said male portion;

b. a plurality of projections extending from said collar and received within said longitudinal passages of said female portion; and c. means for securing said collar to one of said pipe joint portions with said projections positioned within said longitudinal passages thereby restraining relative rotation of the male and female portions to avoid separation thereof.

4. A pipe joint as set forth in claim 2 including:

a. an elongate tapered seat at the termination of the cylindrical inner surface of said female portion at the end away from the free end of said female portion, and an elongate tapered seat end extending from the free end of the male portion; and b. a plurality of circumferential passages corresponding to the plurality of lugs on said male portion, said circumferential passages extending from said respective longitudinal passages in a direction opposite from the circumferential ways, said circumferential passages being spaced from the free end of said female portion and with each having a side surface toward said free end disposed at an angle with the longitudinal axis of the respective tubular member, said angled passage side surfaces being spaced from the seat in the female member a distance substantially corresponding to the spacing of the lugs from the male seat, whereby relative rotative movement of said male and female portions with said lugs engaged with said respective angled passage side surfaces effects movement of the male portion inwardly of the female portion forcing said seats into seating engagement.

5. A pipe joint system comprising:

a. elongate adjacent tubular members having interfitting male and female portions, said female portion having an elongate substantially cylindrical inner surface terminating in an elongate tapered seat, said male portion having an elongate tapered seat end and a cylindrical part extending therefrom corresponding to the inner surface and seat of the female portion, said cylindrical surfaces having suitable clearance therebetween for longitudinal movement of the male portion within said female portion for effecting coupling therewith, said cylindrical surface of the female portion being of a length to provide alignment support for said seats when engaged;

b. interengaging locking means on said male and female portions for retaining said male portion within said respective female portion and for effecting longitudinal movement of said male portion within said respective female portion in response to relative rotative movement of said male and female portions after interengaging of said locking means, said interengaging locking means including:

1. a plurality of lugs circumferentially spaced around said male portion and spaced from said seat thereof, said lugs extending radially outwardly from said cylindrical surface of said male portion;
2. a like plurality of circumferentially spaced longitudinal passages extending into said female portions from a free end thereof for receiving said respective lugs therein and having surfaces for engagement by said lugs;
3. a like plurality of circumferential passages extending from one side of said respective longitudinal passages, said circumferential passages being spaced from the free end of said female portion and with each having a side surface toward said free end disposed at an angle with the longitudinal axis of the respective tubular member, said angled passage side surfaces being spaced from the seat in the female member a distance substantially corresponding to the spacing of the lugs from the male seat, whereby relative rotative movement of said male and female portions with said lugs engaged with said respective angled passage side surfaces effects movement of the male portion inwardly of the female portion forcing said seats into seating engagement;

c. a collar slidably mounted on said male portion;
d. a plurality of projections extending from said collar to be received within said longitudinal passages of said female portions; and
e. means for securing said collar on said male portion while said projections are positioned within said longitudinal passages thereby restraining relative rotation of the respective male and female portions to avoid separation thereof.

6. The pipe joint system as set forth in claim 5 including:

a. adhering material placed on said seat in the female portion;
b. adhering material placed on said seat end of the male portion; and
c. seating engagement of said seats is effected and maintained by relative rotation of said male and female portions whereby the male and female portions are secured together by curing of said adhesive.

* * * * *